(12) United States Patent
Resurreccion, Jr. et al.

(10) Patent No.: US 10,687,662 B2
(45) Date of Patent: Jun. 23, 2020

(54) SUSCEPTOR ON A FIBER REINFORCED FILM FOR EXTENDED FUNCTIONALITY

(71) Applicant: Graphic Packaging International, LLC, Atlanta, GA (US)

(72) Inventors: Fermin P. Resurreccion, Jr., Thornton, CO (US); Alan Fontaine, Louisville, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 499 days.

(21) Appl. No.: 15/395,262

(22) Filed: Dec. 30, 2016

(65) Prior Publication Data
US 2017/0188751 A1    Jul. 6, 2017

Related U.S. Application Data

(60) Provisional application No. 62/273,041, filed on Dec. 30, 2015.

(51) Int. Cl.
*A47J 36/16*    (2006.01)
*B32B 27/12*    (2006.01)
(Continued)

(52) U.S. Cl.
CPC .............. *A47J 36/16* (2013.01); *B32B 1/02* (2013.01); *B32B 3/266* (2013.01); *B32B 5/022* (2013.01); *B32B 5/024* (2013.01); *B32B 7/12* (2013.01); *B32B 15/082* (2013.01); *B32B 15/20* (2013.01); *B32B 27/08* (2013.01); *B32B 27/12* (2013.01);
(Continued)

(58) Field of Classification Search
CPC . A47J 36/16; B32B 1/02; B32B 3/266; B32B 5/022; B32B 5/024; B32B 7/12; B32B 15/082; B32B 15/20; B32B 27/08; B32B 27/12; B32B 27/281; B32B 27/286; B32B 27/288; B32B 27/304; B32B 27/32;
(Continued)

(56) References Cited

U.S. PATENT DOCUMENTS

| | | | |
|---|---|---|---|
| 2,328,563 | A | 9/1943 | Lichter |
| 3,119,540 | A | 1/1964 | Schenk et al. |

(Continued)

FOREIGN PATENT DOCUMENTS

| | | |
|---|---|---|
| EP | 0 943 558 | 11/2006 |
| EP | 2 265 504 | 12/2010 |

(Continued)

OTHER PUBLICATIONS

International Search Report and Written Opinion for PCT/US2016/069403 dated Apr. 24, 2017.
(Continued)

*Primary Examiner* — Phuong T Nguyen
(74) *Attorney, Agent, or Firm* — Womble Bond Dickinson (US) LLP

(57) ABSTRACT

A construct for heating a food product or other item is disclosed. The construct includes at least one wall that at least partially defines an interior of the construct, and which includes a susceptor structure. The susceptor structure includes a carrier layer, a reinforcing layer that includes a fibrous material, a susceptor disposed between the carrier layer and the reinforcing layer, and a support secured to the reinforcing layer.

44 Claims, 2 Drawing Sheets

(51) Int. Cl.

| | | |
|---|---|---|
| *B32B 27/36* | (2006.01) | |
| *B32B 27/32* | (2006.01) | |
| *B32B 27/34* | (2006.01) | |
| *B32B 1/02* | (2006.01) | |
| *B32B 7/12* | (2006.01) | |
| *B32B 27/28* | (2006.01) | |
| *H05B 6/64* | (2006.01) | |
| *B32B 29/02* | (2006.01) | |
| *B32B 3/26* | (2006.01) | |
| *B32B 5/02* | (2006.01) | |
| *B32B 15/082* | (2006.01) | |
| *B32B 15/20* | (2006.01) | |
| *B32B 27/08* | (2006.01) | |
| *B32B 27/30* | (2006.01) | |

(52) U.S. Cl.
CPC .......... *B32B 27/281* (2013.01); *B32B 27/286* (2013.01); *B32B 27/288* (2013.01); *B32B 27/304* (2013.01); *B32B 27/32* (2013.01); *B32B 27/34* (2013.01); *B32B 27/36* (2013.01); *B32B 29/02* (2013.01); *H05B 6/64* (2013.01); *H05B 6/6494* (2013.01); *B32B 2250/03* (2013.01); *B32B 2255/02* (2013.01); *B32B 2255/10* (2013.01); *B32B 2255/20* (2013.01); *B32B 2255/205* (2013.01); *B32B 2255/24* (2013.01); *B32B 2262/0238* (2013.01); *B32B 2262/062* (2013.01); *B32B 2262/101* (2013.01); *B32B 2307/20* (2013.01); *B32B 2307/202* (2013.01); *B32B 2307/204* (2013.01); *B32B 2307/308* (2013.01); *B32B 2307/31* (2013.01); *B32B 2307/40* (2013.01); *B32B 2307/416* (2013.01); *B32B 2307/50* (2013.01); *B32B 2307/542* (2013.01); *B32B 2307/718* (2013.01); *B32B 2307/724* (2013.01); *B32B 2307/732* (2013.01); *B32B 2307/734* (2013.01); *B32B 2439/00* (2013.01); *B32B 2439/02* (2013.01)

(58) Field of Classification Search
CPC ......... B32B 27/34; B32B 27/36; B32B 29/02; H05B 6/64; H05B 6/6494
USPC .......................................... 219/730, 759, 727
See application file for complete search history.

(56) References Cited

U.S. PATENT DOCUMENTS

| | | |
|---|---|---|
| 3,154,617 A | 10/1964 | Schenk et al. |
| 3,226,008 A | 12/1965 | Chiorri |
| 3,662,139 A | 5/1972 | Love |
| 3,834,606 A | 9/1974 | Andersson |
| 3,840,254 A * | 10/1974 | Shatzkin ................ B29C 71/02 281/21.1 |
| 3,967,731 A | 7/1976 | Boduch |
| 4,036,088 A | 7/1977 | Ruskin |
| 4,312,451 A | 1/1982 | Forbes et al. |
| 4,398,994 A | 8/1983 | Beckett |
| 4,552,614 A | 11/1985 | Beckett |
| 4,624,380 A | 11/1986 | Wernette |
| 4,703,148 A | 10/1987 | Mikulski et al. |
| 4,713,510 A | 12/1987 | Quick et al. |
| 4,775,771 A | 10/1988 | Pawlowski |
| 4,777,053 A | 10/1988 | Tobelmann et al. |
| 4,865,921 A | 9/1989 | Hollenberg |
| 4,883,936 A | 11/1989 | Maynard et al. |
| 4,890,439 A | 1/1990 | Smart |
| 4,896,009 A | 1/1990 | Pawlowski |
| 4,927,991 A | 5/1990 | Wendt et al. |
| 4,936,935 A | 6/1990 | Beckett |
| 4,963,424 A | 10/1990 | Beckett |
| 4,971,201 A | 11/1990 | Sathre |
| 5,038,009 A | 8/1991 | Babbitt |
| 5,041,295 A | 8/1991 | Perry et al. |
| 5,053,594 A | 10/1991 | Thota et al. |
| 5,079,397 A | 1/1992 | Keefer |
| 5,093,364 A | 3/1992 | Richards |
| 5,117,078 A | 5/1992 | Beckett |
| 5,164,562 A | 11/1992 | Huffman et al. |
| 5,170,025 A | 12/1992 | Perry |
| 5,213,902 A | 5/1993 | Beckett |
| 5,220,143 A | 6/1993 | Kemske et al. |
| 5,221,419 A | 6/1993 | Beckett |
| 5,239,153 A | 8/1993 | Beckett |
| 5,260,537 A | 11/1993 | Beckett |
| 5,266,386 A | 11/1993 | Beckett |
| 5,278,378 A | 1/1994 | Beckett |
| 5,288,962 A | 2/1994 | Lorence et al. |
| 5,300,746 A | 4/1994 | Walters et al. |
| 5,310,977 A | 5/1994 | Stenkamp et al. |
| 5,317,120 A | 5/1994 | Bunke et al. |
| RE34,683 E | 8/1994 | Maynard |
| 5,334,820 A | 8/1994 | Risch et al. |
| 5,340,436 A | 8/1994 | Beckett |
| 5,354,973 A | 10/1994 | Beckett |
| 5,391,864 A | 2/1995 | Bodor et al. |
| 5,410,135 A | 4/1995 | Pollart |
| 5,424,517 A | 6/1995 | Habeger |
| 5,466,917 A | 11/1995 | Matsuki et al. |
| 5,519,195 A | 5/1996 | Keffer |
| 5,527,413 A | 6/1996 | Perry et al. |
| 5,585,027 A | 12/1996 | Young |
| 5,614,259 A | 3/1997 | Yang et al. |
| 5,628,921 A | 5/1997 | Beckett |
| 5,672,407 A | 9/1997 | Beckett |
| 5,676,276 A | 10/1997 | Zielinski et al. |
| 5,759,422 A | 6/1998 | Schmelzer |
| 5,800,724 A | 9/1998 | Habeger |
| 6,066,375 A | 5/2000 | Shanton |
| 6,114,679 A | 9/2000 | Lai |
| 6,133,560 A | 10/2000 | Zeng et al. |
| 6,137,099 A | 10/2000 | Hamblin |
| 6,150,646 A | 11/2000 | Lai |
| 6,204,492 B1 | 3/2001 | Zeng |
| 6,251,451 B1 | 6/2001 | Zeng |
| 6,413,618 B1 * | 7/2002 | Parker ................ B32B 3/14 428/195.1 |
| 6,414,290 B1 | 7/2002 | Cole |
| 6,433,322 B2 | 8/2002 | Zeng |
| 6,455,827 B2 | 9/2002 | Zeng |
| 6,547,127 B2 | 4/2003 | Bradford et al. |
| 6,552,315 B2 | 4/2003 | Zeng |
| 6,645,584 B1 | 11/2003 | Kuusipalo et al. |
| 6,677,563 B2 | 1/2004 | Lai |
| 6,717,121 B2 | 4/2004 | Zeng |
| 6,765,182 B2 | 7/2004 | Cole |
| 6,988,654 B2 | 1/2006 | Wnek |
| 7,019,271 B2 | 3/2006 | Wnek et al. |
| 7,323,669 B2 | 1/2008 | Robison et al. |
| 7,351,942 B2 | 4/2008 | Wnek et al. |
| 7,365,292 B2 | 4/2008 | Cole et al. |
| 7,868,274 B2 | 1/2011 | Bohme et al. |
| 7,923,669 B2 | 4/2011 | Wnek et al. |
| 7,975,871 B2 | 7/2011 | Wnek et al. |
| 7,982,168 B2 | 7/2011 | Middleton et al. |
| 7,994,456 B2 | 8/2011 | Ford et al. |
| 8,008,609 B2 | 8/2011 | Noyelle et al. |
| 8,124,201 B2 | 2/2012 | O'Hagan et al. |
| 8,158,914 B2 | 4/2012 | Wnek et al. |
| 8,253,083 B2 | 8/2012 | Keefe |
| 8,563,906 B2 | 10/2013 | Wnek et al. |
| 8,629,380 B2 | 1/2014 | Lafferty |
| 8,642,935 B2 | 2/2014 | Robison et al. |
| 8,866,054 B2 | 10/2014 | Wnek et al. |
| 9,132,612 B2 | 9/2015 | Bohrer |
| 9,162,428 B2 | 10/2015 | Lafferty et al. |
| 2001/0032843 A1 | 10/2001 | Aronsson et al. |
| 2002/0137421 A1 | 9/2002 | Desroches et al. |
| 2003/0080119 A1 | 5/2003 | Chisholm et al. |

(56) References Cited

U.S. PATENT DOCUMENTS

| | | |
|---|---|---|
| 2004/0023000 A1* | 2/2004 | Young ................. B65D 81/264 428/138 |
| 2004/0262322 A1 | 12/2004 | Middleton et al. |
| 2005/0148265 A1 | 7/2005 | Blankenbeckler et al. |
| 2006/0049190 A1 | 3/2006 | Middleton et al. |
| 2006/0157480 A1 | 7/2006 | Lafferty |
| 2007/0039951 A1 | 2/2007 | Cole |
| 2007/0145045 A1* | 6/2007 | Middleton ........... B65D 81/264 219/730 |
| 2007/0194029 A1 | 8/2007 | Middleton et al. |
| 2007/0221666 A1 | 9/2007 | Keefe et al. |
| 2007/0251943 A1 | 11/2007 | Wnek et al. |
| 2007/0262487 A1 | 11/2007 | O'Hagan et al. |
| 2007/0264520 A1 | 11/2007 | Wood et al. |
| 2007/0267374 A1 | 11/2007 | Middleton et al. |
| 2008/0000896 A1 | 1/2008 | Lafferty et al. |
| 2008/0069856 A1 | 3/2008 | Lyu et al. |
| 2008/0087664 A1 | 4/2008 | Robison et al. |
| 2008/0164178 A1 | 7/2008 | Wnek et al. |
| 2008/0200037 A1* | 8/2008 | Tsai ...................... H01L 21/304 438/759 |
| 2008/0230537 A1 | 9/2008 | Lafferty |
| 2009/0032529 A1 | 2/2009 | Lafferty |
| 2009/0218338 A1 | 9/2009 | Fitzwater |
| 2009/0236063 A1 | 9/2009 | Onozuka et al. |
| 2009/0250372 A1 | 10/2009 | Wnek et al. |
| 2009/0302032 A1 | 12/2009 | Middleton |
| 2010/0012651 A1* | 1/2010 | Dorsey .............. B65D 81/3461 219/730 |
| 2010/0012652 A1 | 1/2010 | Cole |
| 2010/0029809 A1 | 2/2010 | Kuroda |
| 2010/0044267 A1 | 2/2010 | Tolibas-Spurlock et al. |
| 2010/0144932 A1 | 6/2010 | Kwon et al. |
| 2010/0266792 A1 | 10/2010 | Pfistner et al. |
| 2010/0308064 A1 | 12/2010 | O'Hagan et al. |
| 2010/0314801 A1 | 12/2010 | O'Hagan et al. |
| 2010/0320637 A1 | 12/2010 | Boldizar |
| 2011/0012291 A1 | 1/2011 | Middleton et al. |
| 2011/0172475 A1 | 7/2011 | Peters et al. |
| 2011/0220640 A1 | 9/2011 | Conatser et al. |
| 2011/0227250 A1 | 9/2011 | Wnek et al. |
| 2013/0200528 A1* | 8/2013 | Lin ................... H01L 21/76877 257/774 |
| 2013/0260106 A1 | 10/2013 | Bohrer |

FOREIGN PATENT DOCUMENTS

| | | |
|---|---|---|
| JP | 3-205016 | 9/1991 |
| JP | 5-43705 | 11/1993 |
| JP | 3039410 | 4/1997 |
| JP | 9-295380 | 11/1997 |
| JP | 10-230923 | 9/1998 |
| JP | 3079164 | 6/2000 |
| JP | 2008-207880 | 9/2009 |
| JP | 2009-532088 | 9/2009 |
| JP | 2009-532280 | 9/2009 |
| WO | WO 91/09791 | 7/1991 |
| WO | WO 98/08752 | 3/1998 |
| WO | WO 01/22778 | 3/2001 |
| WO | WO 2007/103428 | 9/2007 |
| WO | WO 2009/114038 | 9/2009 |
| WO | WO 2009/145950 | 12/2009 |
| WO | WO 2011/112770 | 9/2011 |

OTHER PUBLICATIONS

Joshi, S.V., et al. (Michigan State University), "Are Natural Fiber Composites Environmentally Superior To Glass Fiber Reinforced Composites," Composites Part A: Applied Sciences and Manufacturing 35 (2004), 371-376.

Taj, S. et al., "Natural Fiber-Reinforced Polymer Composites," Proc. Pakistan Acad. Sc. 44(2): 129-144, 2007.

Kalia, S., et al., Pretreatments of Natural Fibers And Their Application As Reinforcing Material In Polymer Composites—A Review. (Technical Report), Polymer Engineering and Science, Jul. 1, 2009.

Fotso Talla, A.S., "Design Of A Hemp-Reinforced PET Composite I-Beam," Thesis submitted to the Faculty of Science and Engineering of the Royal Military Academy of Canada, Nov. 2008, Publisher: Ottawa: Library and Archives Canada [2010].

Komula, D., "Completing The Puzzle: 100% Plant-Delivered PET," Bioplastics Magazine, Apr. 2011, vol. 6, pp. 14-17.

* cited by examiner

SUSCEPTOR ON A FIBER REINFORCED FILM FOR EXTENDED FUNCTIONALITY

CROSS-REFERENCE TO RELATED APPLICATION

The present application claims the benefit of U.S. Provisional Patent Application No. 62/273,041, filed on Dec. 30, 2015.

INCORPORATION BY REFERENCE

The disclosure of U.S. Patent Application No. 62/273,041, filed on Dec. 30, 2015, is hereby incorporated by reference for all purposes as if presented herein in its entirety.

BACKGROUND OF THE DISCLOSURE

The present disclosure generally relates to microwave energy interactive structures. More specifically, the present disclosure relates to microwave susceptor structures that incorporate fiber reinforcement.

SUMMARY

In an aspect of the present disclosure, a construct for heating a food product or other item is disclosed. The construct includes at least one wall that at least partially surrounds an interior of the construct, and which includes a susceptor structure. The susceptor structure includes a carrier layer, a reinforcing layer that includes a fibrous material, a susceptor disposed between the carrier layer and the reinforcing layer, and a support secured to the reinforcing layer.

In an aspect of the present disclosure, a susceptor structure for forming a construct for heating a food product or other item is disclosed. The susceptor structure includes a carrier layer, a reinforcing layer that includes a fibrous material, a susceptor disposed between the carrier layer and the reinforcing layer, and a support secured to the reinforcing layer.

In an aspect of the present disclosure, a method of forming a construct for heating a food product or other item is disclosed. The method includes providing a susceptor structure that includes a carrier layer, a reinforcing layer including a fibrous material, a susceptor disposed between the carrier layer and the reinforcing layer, and a support secured to the reinforcing layer. The method also includes folding the susceptor structure to at least partially surround an interior of the construct.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EMBODIMENTS

Various aspects of the invention may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

Figure 1:
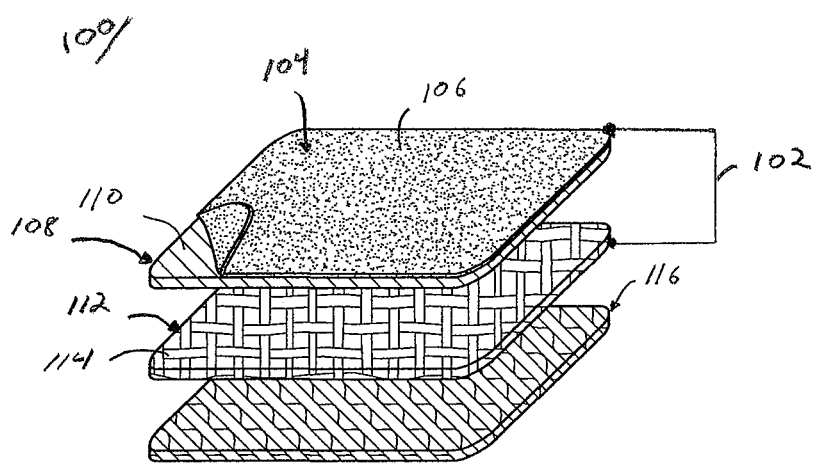
FIG. 1 is a schematic, parts-separated view of a susceptor structure according to a first exemplary embodiment of the disclosure.

Referring to FIG. 1, a portion of a susceptor structure 100 is schematically illustrated according to a first exemplary embodiment of the disclosure. As shown, the susceptor structure 100 includes a reinforced susceptor film 102 joined to a support 116. The above-described components of the susceptor structure 100 may be formed into a construct 120 (e.g., a container, package, sleeve, tray, plate, bowl, mat, or a hingably-closable enclosure, to name a few), as described further herein.

Figure 2:
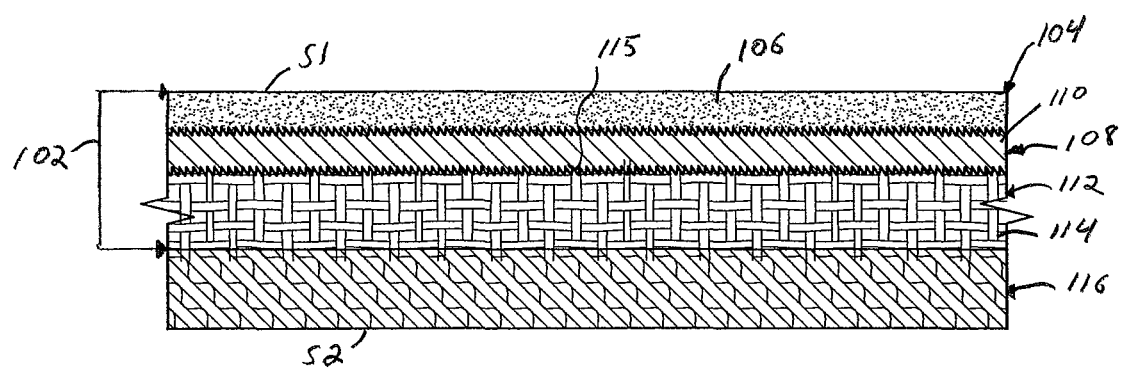
FIG. 2 is a schematic, cross-sectional view of the assembled susceptor structure of FIG. 1.

Referring additionally to the cross-sectional view of FIG. 2, the reinforced susceptor film 102 includes a carrier layer 104 upon which a susceptor 108 has been applied, and a reinforcing layer 112 adjacent the carrier layer 104 and the susceptor 108.

In the illustrated embodiment, the carrier layer 104 includes a polymeric material 106 that may be one or more of, for example, polyethylene (PE), polyethylene terephthalate (PET), and polypropylene (PP). In the first exemplary embodiment, the polymer material 106 may be polyethylene (PE) having a glass transition temperature ($T_G$) of -48.15° C. and a melting temperature ($T_M$) of about 131° C.

The susceptor 108, as shown and described, may be formed of a microwave energy interactive susceptor material 110 that is electroconductive or semiconductive, for example, a metal or a metal alloy. In the exemplary embodiment shown, the susceptor material 110 may be aluminum. The susceptor material 110 may be directly applied to the reinforced susceptor film 102, for example, through chemical deposition or sputtering, at a thickness at or below the skin depth of the material of the susceptor 108 for a particular microwave application, e.g. a thickness of the susceptor 108 above which current density begins to significantly decrease. In this regard, the susceptor 108 may overlie the carrier layer 104, e.g., in a layered arrangement, or the susceptor 108 may be interspersed with the polymeric material 106 along the carrier layer 102.

The reinforcing layer 112, as illustrated, is provided adjacent the carrier layer 104 and the susceptor 108. The reinforcing layer 112 includes a fibrous material 114 that may be, for example, a cellulosic material, a fiber glass material, or a polymeric material having a high glass transition temperature ($T_G$), and may be provided in a woven or non-woven arrangement. In embodiments, the reinforcing layer 112 may have a glass transition temperature ($T_G$) greater than about 75° C., for example, 76° C., 77° C., 78° C., 79° C., 80° C., 81° C., 82° C., 83° C., 84° C., or 85° C., to name a few and a melting temperature greater than about 205° C., for example, 206° C., 207° C., 208° C., 209° C., 210° C., 211° C., 212° C., 213° C., 214° C., or 215° C., to name a few. In the exemplary embodiment illustrated, the fibrous material 114 may be polyvinyl chloride (PVC) having a glass transition temperature ($T_G$) of 80° C. and a melting temperature ($T_M$) of about 210° C. As shown, portions of the fibrous material 114 may extend outwardly from the reinforcing layer 112 such that one or more protrusions 115 are defined. One or more properties of the reinforced susceptor film 102 are affected by the presence of the fibrous material 114, as described further herein.

The support 116, as shown, may be a dimensionally-stable, e.g., at least semi-rigid so as to resist deformation, substrate joined to reinforced susceptor film 102. The support 116 may be formed of a composite material, for example, paper or paperboard. In embodiments, the support 116 may be adhered to the reinforced susceptor film 102, or may be joined to the reinforced susceptor film 102 in another fashion, as described further herein. In embodiments, the fibrous material 114 may be selected with heat-sealing properties such that upon application of heat, e.g., during use of the susceptor structure 100, the fibrous material 114 adhesively secures the carrier layer 104, the susceptor 108, the reinforcing layer 112, and the support 116 to one another.

Figure 3:
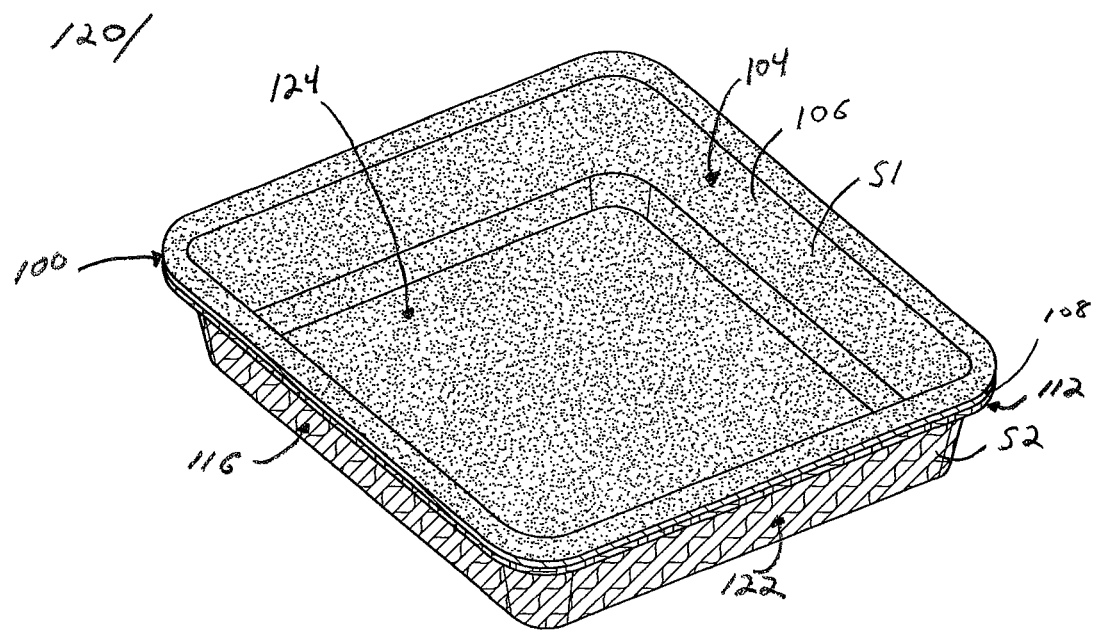
FIG. 3 is a perspective view of a construct at least partially formed from the susceptor structure of FIG. 1.

Still referring to FIGS. 1 and 2, and referring additionally to FIG. 3, a construct 120 may be formed from the susceptor structure 100, for example, by at least partially folding the susceptor structure 100 to define an interior 124 of the construct 120. In this regard, the construct 120 includes at least one wall 122 formed from the susceptor structure 100 such that a surface S1 of the carrier layer 104 provides a contacting surface for a food product or other item placed in the interior 124 of the construct 120 and a surface S2 of the support 116 forms an exterior surface of the construct 120. While the construct 120 has been illustrated as a concave construct, in other embodiments, the construct 120 may have a different configuration for receiving the susceptor structure 100 along a portion thereof, for example, a container, package, sleeve, tray, plate, bowl, mat, or a hingably-closable enclosure, to name a few.

During use of the construct 120 in a microwave heating device, the susceptor 108 absorbs at least a portion of incident microwave radiation and dissipates the energy into heat which can be transferred to a food product or other item in the interior 124 of the construct 120, for example, to provide crisping, browning, or other desired surface treatment to said food product or item.

In conventional susceptor structures, as a food product or other item within a construct continues to heat over time, the temperature gradient, e.g., the driving factor of heat transfer, between the susceptor structure and food product or other item decreases, resulting in higher temperatures of the susceptor structure. Such high temperature conditions can result in polymer material adjoining the susceptor reaching its glass transition temperature, which can cause significant shear stresses along the susceptor (which is bound on an opposite side by a support having a higher glass transition temperature). Significant shear stresses along a susceptor can result in cracks or other discontinuities, for example, micrometer or millimeter cracks, which can interrupt the electrical conduction capacity of a susceptor, which reduces the amount of microwave radiation the susceptor absorbs and subsequently converts into thermal energy.

However, in the first exemplary embodiment, the presence of the fibrous material 114 along the reinforced susceptor film 102 results in a more thermally-stable configuration as compared to that of conventional susceptor structures. For example, the reinforced susceptor film 102 of the susceptor structure 100 has a higher glass transition temperature ($T_G$) such that the susceptor 108 is resistant to cracks or other discontinuities in higher-temperature conditions as compared to conventional susceptor structures, allowing for the susceptor 108 to reach a higher temperature for heating, e.g., cooking, applications. In this regard, the reinforced susceptor film 102 has a glass transition temperature ($T_G$) that is closer to the glass transition temperature ($T_G$) of the support 116 than in conventional susceptor structures. The reinforced susceptor film 102 will also have a higher melting temperature ($T_M$) than in conventional susceptor structures due to the presence of the fibrous material 114 such that higher heating temperatures can be achieved before thermal deformation of the susceptor structure 100 at the melting temperature ($T_M$).

Figure 4:
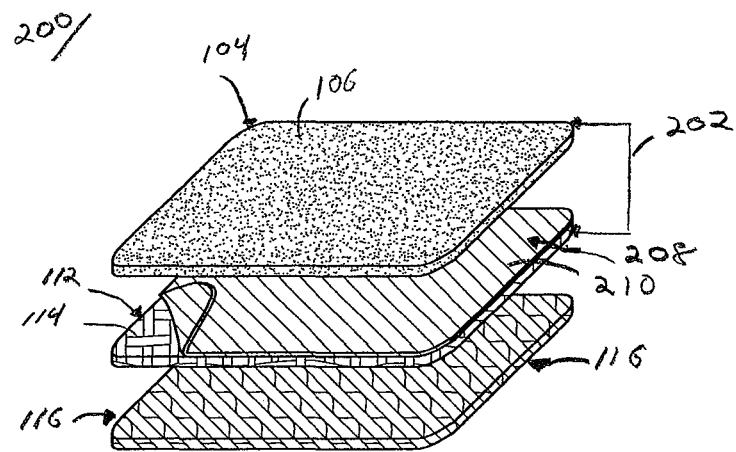
FIG. 4 is a schematic, parts-separated view of a susceptor structure according to a second exemplary embodiment of the disclosure.

Turning now to FIG. 4, a portion of a susceptor structure 200 is schematically illustrated according to a second exemplary embodiment of the disclosure. The susceptor structure 200 may have one or more substantially similar components as the susceptor structure 100 described above, which are indicated with like reference numbers. As shown, the susceptor structure 200 includes a reinforced susceptor film 202 joined to the support 116. The above-described components of the susceptor structure 100 may be formed into a construct 220 (e.g., a container, package, sleeve, tray, plate, bowl, mat, or a hingably-closable enclosure, to name a few), as described further herein.

Referring additionally to the cross-sectional view of FIG. 4, the reinforced susceptor film 202 includes the carrier layer 104 formed of the polymeric material 106, and the reinforcing layer 112 having the fibrous material 114 and upon which a susceptor 208 is applied. In the illustrated embodiment, the susceptor 208 is applied directly to the reinforcing layer 112 of susceptor structure 200, wherein in the first exemplary embodiment of the disclosure, the susceptor 108 is applied directly to the carrier layer 104 of the susceptor structure 100.

As described above, the fibrous material 114 may be selected from a material having heat-sealing properties such that upon application of heat, e.g., during use of the susceptor structure 200, the fibrous material 114 adhesively secures the reinforced susceptor film 202 to the support 116 obviating the need for an adhesive or other securement of reinforced susceptor film 202 to support 116. In addition, the carrier layer 104 may be selected with heat-sealing properties such that upon application of heat, the carrier layer 104 and reinforcing layer 112 with susceptor 208 can be secured to one another without the need for an adhesive or other securement of reinforced susceptor film 202 to support 116.

The susceptor 208, as shown and described, may be substantially similar to the susceptor 108 described above in that susceptor 208 may be formed of a microwave energy interactive susceptor material 210 that is electroconductive or semiconductive, for example, a metal or a metal alloy. In the exemplary embodiment shown, the susceptor material 210 may be aluminum. The susceptor 208 may be directly applied to the reinforcing layer 112, for example, through chemical deposition or sputtering. The susceptor 208 may be applied such that the susceptor 208 is formed thickness at or below the skin depth of the material of the susceptor 208 for a particular microwave application. In this regard, the susceptor 208 may overlie the reinforcing layer 112, e.g., in a layered arrangement, or the susceptor 208 may be interspersed with the fibrous material 114 along the reinforcing layer 112.

In the illustrated embodiment, the interface between the reinforcing layer 112 and the susceptor 208 may be such that the one or more protrusions 115 of the reinforcing layer 112 may carry a portion of the susceptor 208 and/or may influence a surface pattern of the susceptor 208, as shown. In particular, the fibrous material 114 of the reinforcing layer 112 may engage one or more portions of the susceptor 208 to cause an at least partial deformation of some of the susceptor material 210 toward the carrier layer 104.

Figure 5:
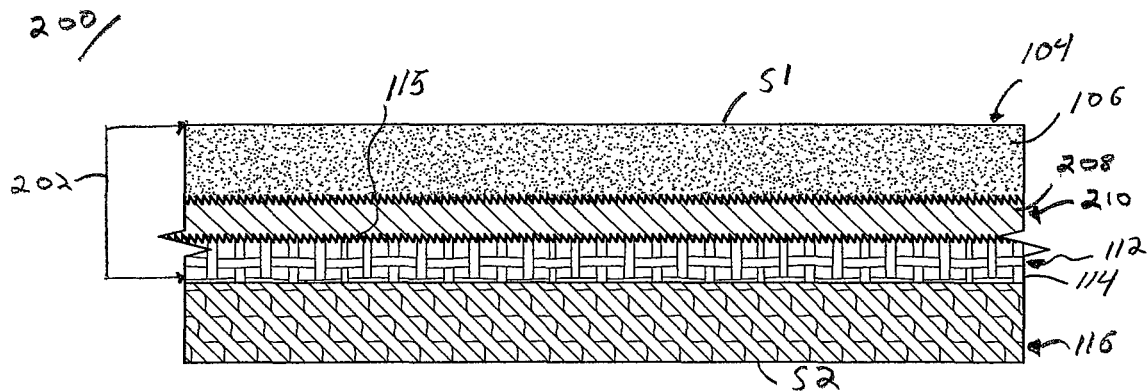
FIG. 5 is a schematic, cross-sectional view of the assembled susceptor structure of FIG. 4.
Figure 6:
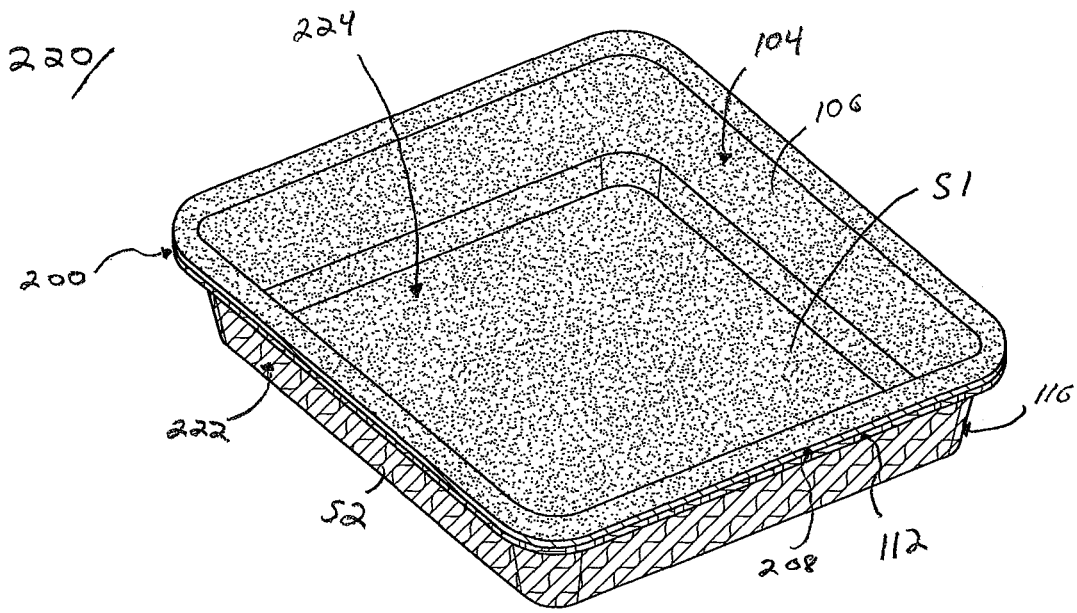
FIG. 6 is a perspective view of a construct at least partially formed from the susceptor structure of FIG. 4.

Still referring to FIGS. 4 and 5, and referring additionally to FIG. 6, a construct 220 may be formed from the susceptor structure 200, for example, by at least partially folding the susceptor structure 200 to define an interior 224 of the construct 220. In this regard, the construct 220 includes at least one wall 222 formed from the susceptor structure 200 such that a surface of the carrier layer 104 provides a contacting surface for a food product or other item placed in the interior 224 of the construct 220 and a surface of the support 116 forms an exterior surface of the construct 220. While construct 220 has been illustrated as a concave construct, in embodiments, the construct 220 may have a different configuration for receiving the susceptor structure 200 along a portion thereof, for example, a container, package, sleeve, tray, plate, bowl, mat, or a hingably-closable enclosure, to name a few.

During use of the construct 220 in a microwave heating device, the susceptor 208 absorbs at least a portion of incident microwave radiation and dissipates the energy into heat which can be transferred to a food product or other item in the interior 226 of the construct 220, for example, to provide crisping, browning, or other desired surface treatment to said food product or item.

As described above with respect to susceptor structure 100, the presence of the fibrous material 114 along the reinforced susceptor film 202 results in a more thermally-stable configuration as compared to that of conventional susceptor structures. For example, the reinforced susceptor film 202 of susceptor structure 200 has a higher glass transition temperature ($T_G$) such that the susceptor 208 is resistant to cracks or other discontinuities in higher-temperature conditions as compared to conventional susceptor structures, allowing for the susceptor 208 to reach a higher temperature for heating, e.g., cooking, applications. In this regard, the reinforced susceptor film 202 has a glass transition temperature ($T_G$) that is closer to the glass transition temperature ($T_G$) of the support 116 than in conventional susceptor structures. The reinforced susceptor film 202 will also have a higher melting temperature ($T_M$) than in conventional susceptor structures due to the presence of the fibrous material 114 such that higher heating temperatures can be achieved before thermal deformation of the susceptor structure 200 at the melting temperature ($T_M$). In addition, the presence of the reinforcing layer 112 between the carrier layer 104 and the support 116 allows the reinforcing layer 112 to absorb shear stresses generated during heating of susceptor 208, which also contributes to the ability of susceptor 208 to reach higher temperatures as compared to conventional susceptor structures while avoiding the formation of cracks or other discontinuities therealong.

Further, the presence of protrusions 115 of the fibrous material 114 influences the surface configuration of the reinforced susceptor film 202 facing the carrier layer 104 such that the susceptor 208 is formed having a greater surface area than in a flat, layered configuration. In this regard, the susceptor 208 is provided in an enhanced surface area arrangement such that a greater amount of the susceptor 208 is available for microwave energy absorption and conversion into heat as compared to conventional susceptor structures while still maintaining a selected thickness, e.g., a skin depth for a particular microwave application, along the reinforced susceptor film 202.

As described herein, the disclosed susceptor structures and constructs may be provided in alternative configurations than described.

For example, in embodiments, polymeric material may be selected from one or more of polyolefins, polyesters, polyamides, polyimides, polysulfones, polyether ketones, cellophanes, or any combination thereof. The thickness of carrier layers as described herein generally may be from about 35 gauge to about 10 mil. As described herein, the thickness of the carrier layer may be from about 40 to about 80 gauge, from about 45 to about 50 gauge, about 48 gauge, or any other suitable thickness. In embodiments, a different material may be substituted for or provided in addition to a polymer material, for example, another non-conducting substrate material such as paper and paper laminates, metal oxides, silicates, cellulosics, or any combination thereof.

Supports described herein may be composed of a composite material, for example, paper or paperboard. In embodiments, supports may be formed from paperboard having a basis weight of from about 60 to about 330 lbs/ream, for example, from about 80 to about 140 lbs/ream. In embodiments, supports may generally have a thickness of from about 6 to about 30 mils, for example, from about 12 to about 28 mils. In one particular example, a support has a thickness of about 12 mils. Any suitable paperboard may be used for a support, for example, a solid bleached or solid unbleached sulfate board, such as SUS® board, commercially available from Graphic Packaging International of Atlanta, Ga.

As described herein, susceptors may be formed from a microwave energy interactive material that is electroconductive or semiconductive, for example, a metal or a metal alloy provided as a metal foil, a vacuum deposited metal or metal alloy, a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof. In embodiments, susceptors may be formed from one or more of a metal oxide, a dielectric, a ferroelectric, or may be carbon-based. In embodiments, susceptors may be selected from a material that is generally at least several angstroms thick and less than about 100 angstroms in thickness, for example, from about 50 to about 100 angstroms in thickness, and having an optical density from about 0.15 to about 0.35, for example, about 0.21 to about 0.28.

It will be apparent that numerous other sequences of steps may be used to form constructs as described herein. It also will be apparent that numerous other microwave energy interactive insulating materials or structures may be used to form a construct in accordance with the disclosure. Any of such materials may be used alone or in combination, and in any configuration, to form the construct. Where multiple materials (or multiple layers of the same material) are used, the materials may be joined to one another partially or completely, or may remain separate from one another (i.e., unjoined).

Countless other microwave energy interactive structures and constructs are contemplated by the disclosure. If desired, any of such structures may include one or more areas that are transparent to microwave energy. Such microwave energy transparent areas transmit microwave energy and, in some instances, may cause the formation of localized electric fields that enhance heating, browning, and/or crisping of an adjacent food product or other item. The transparent areas may be sized, positioned, and/or arranged to customize the heating, browning, and/or crisping of a particular area of the food product or other item to be heated.

Any of such structures or constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors are illustrated herein, the construct also may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches.

Larger microwave energy reflecting elements may be used where a food product or other item is prone to scorching or drying out during heating and therefore, may be referred to as shielding elements. Smaller microwave energy reflecting elements may be used to diffuse or lessen the intensity of microwave energy. A plurality of smaller microwave energy reflecting elements also may be arranged to form a microwave energy directing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of a food product or other item selectively. The breaks or apertures may extend through the entire structure, or only through one or more layers. The number, shape, size, and positioning of such breaks or apertures may vary for a particular application depending on the type of construct being formed, the food product or other item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that an aperture may be a physical aperture or void in one or more layers or materials used to form the construct, or may be a non-physical "aperture" (not shown). A non-physical aperture is a microwave energy transparent area that allows microwave energy to pass through the structure without an actual void or hole cut through the structure. Such areas may be formed by simply not applying microwave energy interactive material to the particular area, or by removing microwave energy interactive material in the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive (i.e., microwave energy transparent) area may be increased. In doing so, more microwave energy is transmitted to the food product or other item. Alternatively, by decreasing the total inactive area, more microwave energy is absorbed by the microwave energy interactive areas, converted into thermal energy, and transmitted to the surface of the food product or other item to enhance heating, browning, and/or crisping.

In some instances, it may be beneficial to create one or more discontinuities or inactive regions to prevent overheating or charring of the construct. Such areas may be formed by forming these areas of the construct without a microwave energy interactive material, by removing any microwave energy interactive material that has been applied, or by deactivating the microwave energy interactive material in these areas, as discussed above.

Further still, one or more panels, portions of panels, or portions of the construct may be designed to be microwave energy inactive to ensure that the microwave energy is focused efficiently on the areas to be heated, browned, and/or crisped, rather than being lost to portions of the food product or other item not intended to be browned and/or crisped or to the heating environment. This may be achieved using any suitable technique, such as those described above.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

The susceptor structures and adhesives disclosed herein may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of a construct to be formed (e.g., a blank).

It will be understood that with some combinations of elements and materials, the microwave energy interactive element may have a grey or silver color that is visually distinguishable from a support. However, in some instances, it may be desirable to provide a construct having a uniform color and/or appearance. Such a construct may be more aesthetically pleasing to a consumer, particularly when the consumer is accustomed to constructs having certain visual attributes, for example, a solid color, a particular pattern, and so on. Thus, for example, the present disclosure contemplates using a silver or grey toned adhesive to join the microwave energy interactive element to a support, using a silver or grey toned support to mask the presence of the silver or grey toned microwave energy interactive element, using a dark toned substrate, for example, a black toned substrate, to conceal the presence of the silver or grey toned microwave energy interactive element, overprinting the metallized side of a carrier layer with a silver or grey toned ink to obscure the color variation, printing a non-metallized side of the carrier layer with a silver or grey ink or other concealing color in a suitable pattern or as a solid color layer to mask or conceal the presence of the microwave energy interactive element, or any other suitable technique or combination of techniques.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A construct for heating a food product or other item, comprising:

at least one wall at least partially surrounding an interior of the construct, the at least one wall comprising a susceptor structure that comprises:
a carrier layer;
a reinforcing layer comprising a fibrous material;
a susceptor disposed between the carrier layer and the reinforcing layer; and a support secured to the reinforcing layer,
the reinforcing layer absorbs shear stresses between the carrier layer and the support, and the carrier layer and the reinforcing layer together have a higher glass transition temperature than a glass transition temperature of the carrier layer alone;
wherein the reinforcing layer is configured such that one or more protrusions extend outwardly from a plane along which the reinforcing layer extends; and
wherein at least a portion of the susceptor is disposed along the one or more protrusions.

2. The construct of claim 1, wherein the fibrous material is provided in a non-woven arrangement.

3. The construct of claim 1, wherein the fibrous material is provided in a woven arrangement.

4. The construct of claim 1, wherein the fibrous material is selected from the group consisting of: cellulosic materials, fiber glass materials, and polymeric materials having a high glass transition temperature.

5. The construct of claim 1, wherein the reinforcing layer comprises polyvinyl chloride.

6. The construct of claim 1, wherein the reinforcing layer has a glass transition temperature greater than 75° C.

7. The construct of claim 1, wherein the susceptor is deposited on the carrier layer.

8. The construct of claim 1, wherein the susceptor is deposited on the reinforcing layer.

9. The construct of claim 1, wherein the fibrous material is a heat-sealable material.

10. The construct of claim 1, wherein the susceptor structure is devoid of adhesive.

11. The construct of claim 1, wherein the carrier layer comprises a polymeric material.

12. The construct of claim 11, wherein the polymeric material is selected from the group consisting of polyethylene, polyethylene terephthalate, and polypropylene.

13. The construct of claim 1, wherein the carrier layer comprises a heat-sealable material.

14. The construct of claim 1, wherein the susceptor comprises aluminum.

15. The construct of claim 1, wherein the carrier layer provides a food-contacting surface of the susceptor structure.

16. A susceptor structure for forming a construct for heating a food product or other item, comprising:
a carrier layer;
a reinforcing layer comprising a fibrous material;
a susceptor disposed between the carrier layer and the reinforcing layer; and a support secured to the reinforcing layer,
the reinforcing layer absorbs shear stresses between the carrier layer and the support, and the carrier layer and the reinforcing layer together have a higher glass transition temperature than a glass transition temperature of the carrier layer alone;
wherein the reinforcing layer is configured such that one or more protrusions extend outwardly from a plane along which the reinforcing layer extends; and
wherein at least a portion of the susceptor is disposed along the one or more protrusions.

17. The susceptor structure of claim 16, wherein the fibrous material is provided in a non-woven arrangement.

18. The susceptor structure of claim 16, wherein the fibrous material is provided in a woven arrangement.

19. The susceptor structure of claim 16, wherein the fibrous material is selected from the group consisting of: cellulosic materials, fiber glass materials, and polymeric materials having a high glass transition temperature.

20. The susceptor structure of claim 16, wherein the reinforcing layer comprises polyvinyl chloride.

21. The susceptor structure of claim 16, wherein the reinforcing layer has a glass transition temperature greater than 75° C.

22. The susceptor structure of claim 16, wherein the susceptor is deposited on the carrier layer.

23. The susceptor structure of claim 16, wherein the susceptor is deposited on the reinforcing layer.

24. The susceptor structure of claim 16, wherein the fibrous material is a heat-sealable material.

25. The susceptor structure of claim 16, wherein the susceptor structure is devoid of adhesive.

26. The susceptor structure of claim 16, wherein the carrier layer comprises a polymeric material.

27. The susceptor structure of claim 26, wherein the polymeric material is selected from the group consisting of polyethylene, polyethylene terephthalate, and polypropylene.

28. The susceptor structure of claim 16, wherein the carrier layer comprises a heat-sealable material.

29. The susceptor structure of claim 16, wherein the susceptor comprises aluminum.

30. The susceptor structure of claim 16, wherein the carrier layer provides a food-contacting surface of the susceptor structure.

31. A method of forming a susceptor structure for heating a food product or other item, the method comprising:
obtaining a carrier layer, a reinforcing layer, a susceptor, and a support layer;
depositing the susceptor on at least one of the carrier layer and the reinforcing layer such that a susceptor layer is formed between the carrier layer and the reinforcing layer; and
securing the support layer to the reinforcing layer such that the reinforcing layer absorbs shear stresses between the carrier layer and the support, the carrier layer and the reinforcing layer together have a higher glass transition temperature than a glass transition temperature of the carrier layer alone;
wherein the reinforcing layer is configured such that one or more protrusions extend outwardly from a plane along which the reinforcing layer extends; and
wherein at least a portion of the susceptor is disposed along the one or more protrusions.

32. The method of claim 31, wherein the fibrous material is provided in a non-woven arrangement.

33. The method of claim 31, wherein the fibrous material is provided in a woven arrangement.

34. The method of claim 31, wherein the fibrous material is selected from the group consisting of: cellulosic materials, fiber glass materials, and polymeric materials having a high glass transition temperature.

35. The method of claim 31, wherein the reinforcing layer comprises polyvinyl chloride.

36. The method of claim 31, wherein the reinforcing layer has a glass transition temperature greater than 75° C.

37. The method of claim 31, wherein the fibrous material is a heat-sealable material.

38. The method of claim 31, wherein the susceptor structure is devoid of adhesive.

39. The method of claim 31, wherein the carrier layer comprises a polymeric material.

40. The method of claim 39, wherein the polymeric material is selected from the group consisting of polyethylene, polyethylene terephthalate, and polypropylene.

41. The method of claim 31, wherein the carrier layer comprises a heat-sealable material.

42. The method of claim 31, wherein the susceptor comprises aluminum.

43. The method of claim 31, wherein the carrier layer provides a food-contacting surface of the susceptor structure.

44. A construct for heating a food product or other item, comprising:
at least one wall at least partially surrounding an interior of the construct, the at least one wall comprising a susceptor structure that comprises:
a carrier layer;
a reinforcing layer comprising a fibrous material and having a glass transition temperature greater than 75° C.;
a susceptor applied to one of the carrier layer and the reinforcing layer; and a support secured to the reinforcing layer,
the reinforcing layer absorbs shear stresses between the carrier layer and the support, and the carrier layer and the reinforcing layer together have a higher glass transition temperature than a glass transition temperature of the carrier layer alone;
wherein the reinforcing layer is configured such that one or more protrusions extend outwardly from a plane along which the reinforcing layer extends; and
wherein at least a portion of the susceptor is disposed along the one or more protrusions.

* * * * *